US012567771B1

(12) United States Patent
Wang

(10) Patent No.: US 12,567,771 B1
(45) Date of Patent: Mar. 3, 2026

(54) WIRELESS CHARGING RECEIVER MODULE AND WIRELESS POWER RECEIVING DEVICE

(71) Applicant: Primax Electronics Ltd., Taipei (TW)

(72) Inventor: Sheng-Cai Wang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 19/072,256

(22) Filed: Mar. 6, 2025

(30) Foreign Application Priority Data

Jan. 22, 2025 (CN) .......................... 202510103870.X

(51) Int. Cl.
| | |
|---|---|
| *H02J 50/70* | (2016.01) |
| *G06F 3/0354* | (2013.01) |
| *G06F 3/038* | (2013.01) |
| *H02J 50/00* | (2016.01) |
| *H02J 50/10* | (2016.01) |

(52) U.S. Cl.
CPC .......... *H02J 50/70* (2016.02); *G06F 3/03543* (2013.01); *G06F 3/0383* (2013.01); *H02J 50/005* (2020.01); *H02J 50/10* (2016.02)

(58) Field of Classification Search
CPC .......... H02J 50/70; H02J 50/10; H02J 50/005; G06F 3/03543; G06F 3/0383
See application file for complete search history.

(56) References Cited

U.S. PATENT DOCUMENTS

| | | | |
|---|---|---|---|
| 11,588,355 B1 * | 2/2023 | Lu .......................... | H02J 7/0042 |
| 11,601,003 B2 * | 3/2023 | Tseng ........................ | H02J 7/02 |
| 2022/0131403 A1 * | 4/2022 | Tseng .................... | H02J 50/005 |

* cited by examiner

*Primary Examiner* — Peter D Mcloone
(74) *Attorney, Agent, or Firm* — KIRTON McCONKIE; Evan R. Witt

(57) ABSTRACT

The present invention provides a wireless charging receiver module, which includes a cover body, a circuit board, a set of first electrical connectors, a conductive coil and a first magnetic shielding layer. An upper cover portion of the cover body has a plurality of first through holes. The circuit board is located in the cover body. The set of first electrical connectors have a plurality of first conductive end portions exposed from an upper surface of the circuit board and respectively exposed from the first through holes. The conductive coil is located in the cover body and disposed beneath the circuit board. The first magnetic shielding layer is located in the cover body and disposed between the circuit board and the conductive coil. The present invention also provides a wireless power receiving device, which can accommodate and electrically connect to the above-mentioned wireless charging receiver module.

10 Claims, 5 Drawing Sheets

WIRELESS CHARGING RECEIVER MODULE AND WIRELESS POWER RECEIVING DEVICE

FIELD OF THE INVENTION

The present invention relates to a wireless charging receiver module and a wireless power receiving device.

BACKGROUND OF THE INVENTION

Existing wireless charging receivers of electronic products with a wireless charging function are usually custom developed based on the electronic products, which prolongs the development cycle of the electronic product and increases the development cost. In addition, some wireless charging receivers use A4WP or NFC technology, but those have high manufacturing cost, low wireless charging efficiency, high power consumption and poor compatibility.

SUMMARY OF THE INVENTION

The present invention provides a wireless charging receiver module, which includes a cover body, a circuit board, a set of first electrical connectors, a conductive coil and a first magnetic shielding layer. An upper cover portion of the cover body has a plurality of first through holes. The circuit board is located in the cover body. The set of first electrical connectors have a plurality of first conductive end portions exposed from an upper surface of the circuit board and respectively exposed from the first through holes. The conductive coil is located in the cover body and disposed beneath the circuit board. The first magnetic shielding layer is located in the cover body and disposed between the circuit board and the conductive coil.

In some embodiments of the present invention, the first magnetic shielding layer includes nickel zinc ferrite, manganese zinc ferrite, nano gold or a combination thereof.

In some embodiments of the present invention, a vertical projection of the conductive coil is located within a vertical projection of the first magnetic shielding layer.

In some embodiments of the present invention, the wireless charging receiver module further includes: a set of second electrical connectors, having a plurality of second conductive end portions exposed from the upper surface of the circuit board, in which the first conductive end portions and the second conductive end portions are respectively disposed on opposite sides of the upper surface of the circuit board, and the first conductive end portions and the second conductive end portions are respectively exposed from the first through holes.

In some embodiments of the present invention, an upper surface of each of the first conductive end portions is substantially coplanar with an upper surface of the upper cover portion or lower than the upper surface of the upper cover portion.

In some embodiments of the present invention, the first conductive end portions are respectively a voltage output line (Vout) contact, a ground line (GND) contact, a serial data line (SDA) contact and a serial clock line (SCL) contact.

The present invention also provides a wireless power receiving device, which includes a housing, a mainboard and a set of third electrical connectors. A lower housing portion of the housing has a recessed portion, and the recessed portion is configured to accommodate the above-mentioned wireless charging receiver module and has a plurality of second through holes. The mainboard is located in the housing. The set of third electrical connectors has a plurality of third conductive end portions exposed from a lower surface of the mainboard and respectively exposed from the second through holes of the recessed portion, in which the third conductive end portions are configured to be respectively electrically connected to the first conductive end portions of the set of first electrical connectors of the above-mentioned wireless charging receiver module.

In some embodiments of the present invention, the wireless power receiving device further includes: a second magnetic shielding layer, located in the housing and disposed on the lower surface of the mainboard.

In some embodiments of the present invention, the wireless power receiving device further includes: a protective layer, disposed on a lower surface of the second magnetic shielding layer.

In some embodiments of the present invention, the wireless power receiving device further includes: a second magnetic shielding layer, located in the housing and adjacent to the set of third electrical connectors and the recessed portion.

In some embodiments of the present invention, the recessed portion further has a third through hole disposed opposite to the second through holes, and the wireless power receiving device further includes: an elastic abutment member, exposed from the third through hole of the recessed portion.

In some embodiments of the present invention, the wireless power receiving device is a computer mouse.

BRIEF DESCRIPTION OF THE DRAWINGS

Aspects of the present invention are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAILED DESCRIPTION OF THE PREFERRED EMBODIMENT

Figure 1:
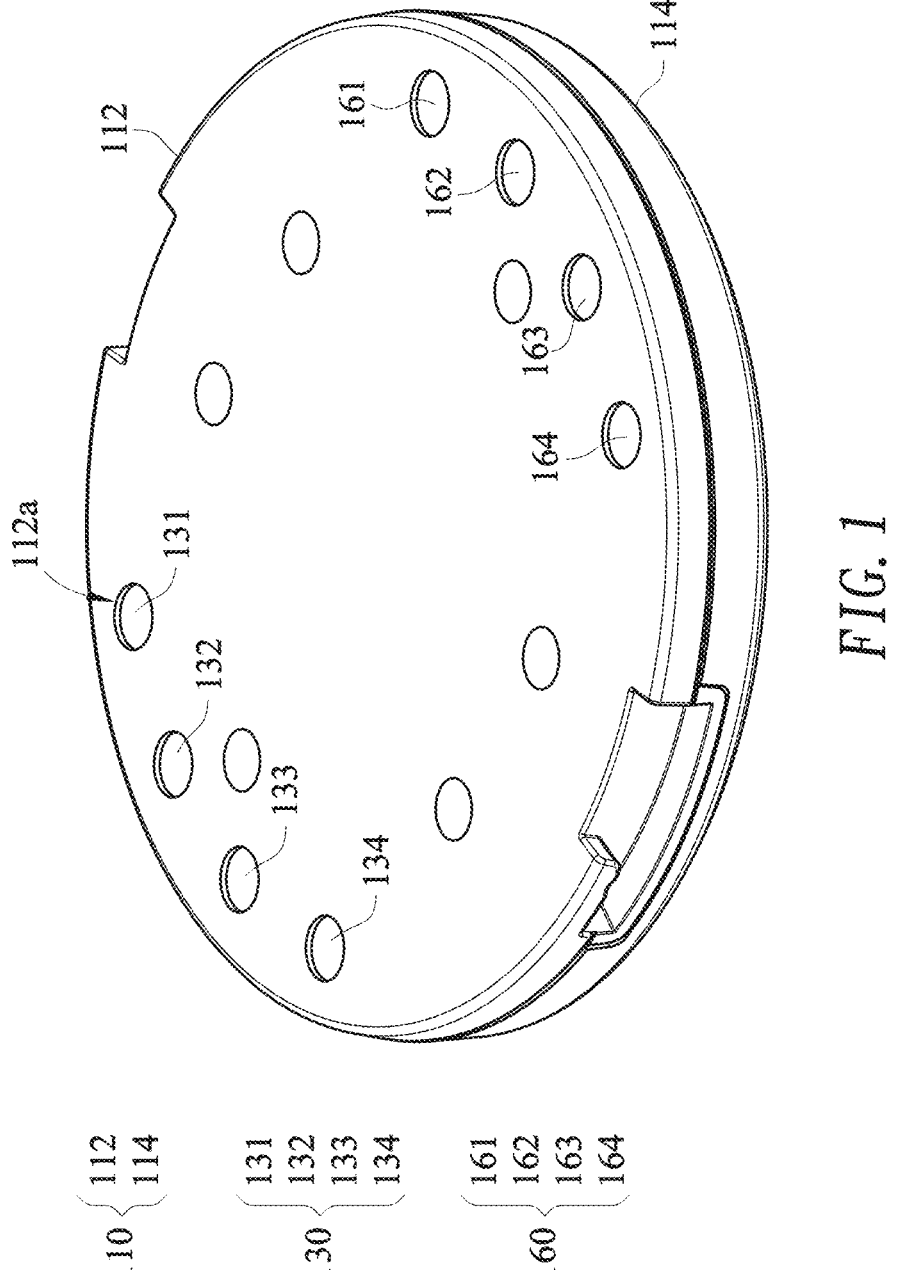
FIG. 1 is a three-dimensional schematic diagram of a wireless charging receiver module according to an embodiment of the present invention.

The advantages and features of the present invention and the method for achieving the same will be described in more detail with reference to exemplary embodiments and accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in the prior art, the wireless charging receivers of existing electronic products with a wireless charging function are usually custom developed based on the electronic products, which prolongs the development cycle of the electronic product and increases the development cost. In addition, some wireless charging receivers use A4WP or NFC technology, but those have high manufacturing cost, low wireless charging efficiency, high power consumption and poor compatibility.

Accordingly, the present invention provides a wireless charging receiver module, which includes a cover body, a circuit board, a set of first electrical connectors, a conductive coil and a first magnetic shielding layer. The wireless charging receiver module of the present invention adopts electromagnetic induction charging technology, so the manufacturing cost is lower and the wireless charging efficiency is higher. In addition, the wireless charging receiver module of the present invention can adopt Qi wireless charging standard, which can be used with various Qi-certified wireless charging transmitters, so it has high compatibility. Furthermore, the wireless charging receiver module of the present invention has the independent circuit board; in other words, the circuit of the wireless charging receiving end is not integrated with the circuit of the electronic product, thus not affecting the development cycle of the circuit design of the electronic product. Furthermore, the wireless charging receiver module of the present invention is convenient to disassemble and replace, and will not cause improper waste of materials during replacement. Furthermore, the wireless charging receiver module of the present invention has the first magnetic shielding layer disposed between the circuit board and the conductive coil, which has magnetic shielding and magnetic conducting functions, and thus can effectively improve the wireless charging efficiency. Specifically, when the conductive coil generates a changing magnetic field, magnetic field lines will be blocked by the first magnetic shielding layer, and the magnetic field lines are then guided from the middle to the edge of the first magnetic shielding layer back to conductive coil, forming a closed loop, so that magnetic field coupling between the wireless charging receiver module and the wireless charging transmitter is better, which can effectively improve the wireless charging efficiency. Various embodiments of the wireless charging receiver module of the present invention are described in detail below.

Figure 2:
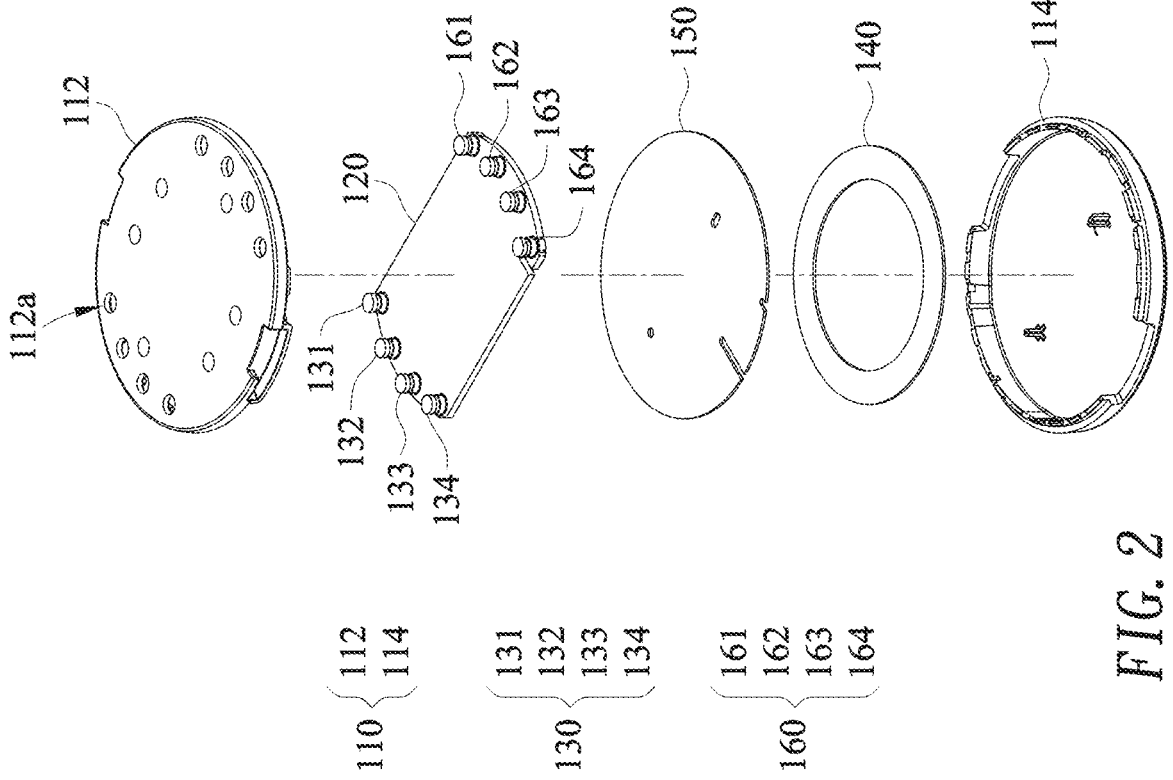
FIG. 2 is a three-dimensional exploded view of a wireless charging receiver module according to an embodiment of the present invention.

FIG. 1 is a three-dimensional schematic diagram of a wireless charging receiver module according to an embodiment of the present invention. FIG. 2 is a three-dimensional exploded view of a wireless charging receiver module according to an embodiment of the present invention. As shown in FIGS. 1 and 2, the wireless charging receiver module includes a cover body 110, a circuit board 120, a set of first electrical connectors 130, a conductive coil 140 and a first magnetic shielding layer 150.

Figure 5:
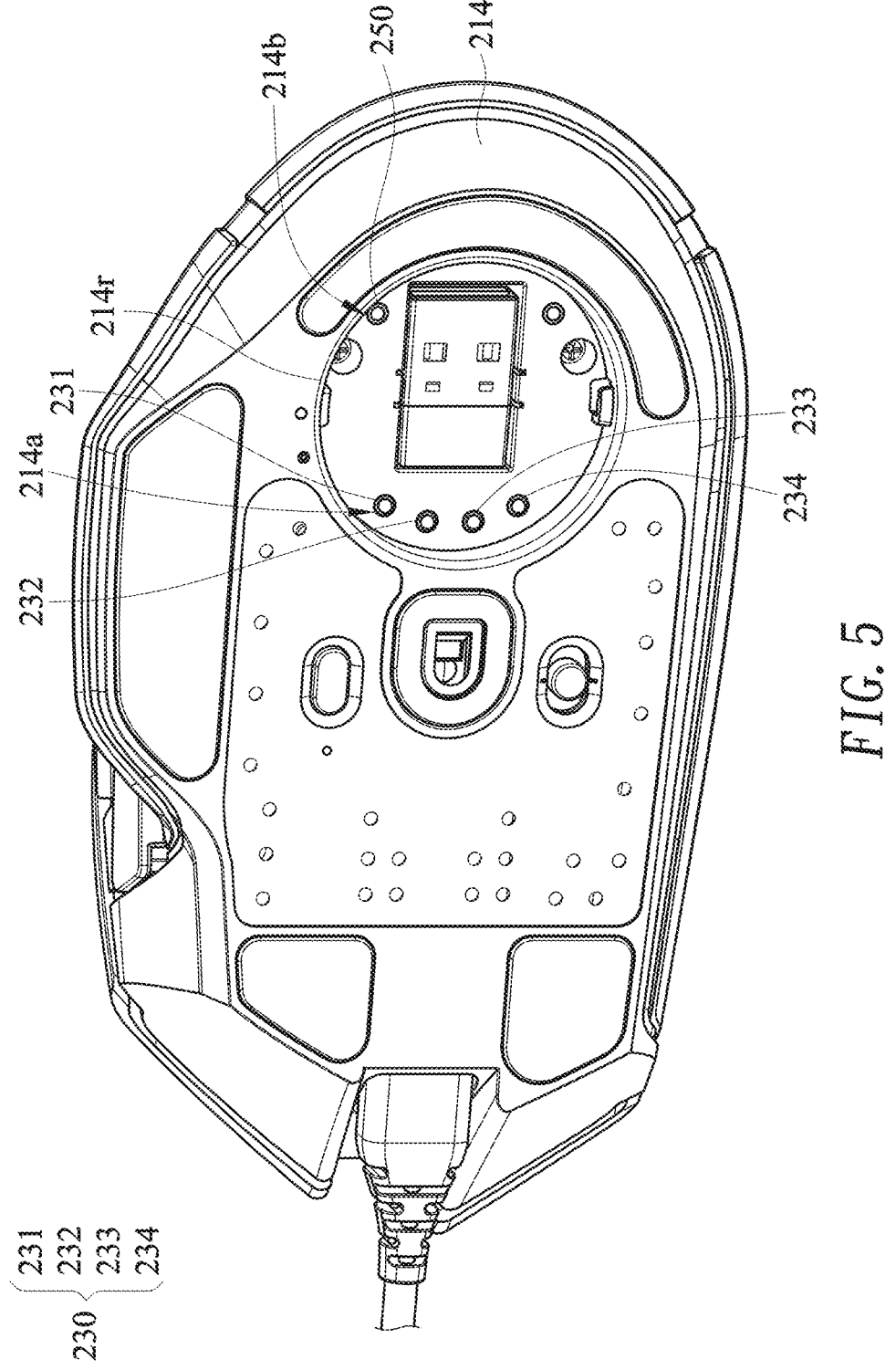
FIG. 5 is a three-dimensional schematic diagram of the wireless power receiving device of FIG. 4 from another viewing angle.

In some embodiments, the cover body 110 has an upper cover portion 112 and a lower cover portion 114. The upper cover portion 112 has a plurality of first through holes 112a. In some embodiments, two or more slots (not marked) are disposed on sides of the cover body 110. The user can rotate the wireless charging receiver module to insert it into a wireless power receiving device (as shown in FIG. 5) or remove it from the wireless power receiving device. In some embodiments, the upper cover portion 112 further has one or more supporting portions (or may be referred to as protrusions, not marked), which can help to smoothly assemble or disassemble the wireless charging receiver module. In some embodiments, the cover body 110 has a circular appearance. However, the present invention is not limited to the aforementioned embodiments. In other embodiments, the appearance of the cover body 110 may be a polygon (e.g., a square, a triangle) or another shape.

The circuit board 120 is located inside the cover body 110. In some embodiments, a length of the circuit board 120 is no greater than a diameter of the first magnetic shielding layer 150, and a width of the circuit board 120 is no greater than a diameter of the first magnetic shielding layer 150, so as to achieve lightweight, good heat dissipation and higher wireless charging efficiency of the circuit board 120.

The set of first electrical connectors 130 has a plurality of first conductive end portions 131, 132, 133, 134 exposed from an upper surface of the circuit board 120 and respectively exposed from the first through holes 112a. However, the present invention is not limited to the aforementioned embodiments, and a number of the first conductive end portions may be less than four or greater than four according to actual needs. In some embodiments, the first conductive end portions 131, 132, 133, and 134 are metal pillars (e.g., copper pillars), metal springs, or conductors having other shapes. In some embodiments, an upper surface of each of the first conductive end portions 131, 132, 133, 134 is substantially coplanar with an upper surface of the upper cover portion 112 or lower than the upper surface of the upper cover portion 112.

In some embodiments, the first conductive end portions 131, 132, 133, and 134 are respectively a voltage output line (Vout) contact, a ground line (GND) contact, a serial data line (SDA) contact, and a serial clock line (SCL) contact. In some embodiments, the wireless power receiving device can measure output voltage VOUT/VRECT of the wireless charging receiver module in the no-load mode and the loaded mode through I²C (serial data line, serial clock line), and compare it with a set target voltage to confirm whether the wireless charging receiver module and the wireless charging transmitter have reached an optimal charging state, and can remind the user of a current charging state of the power receiving device through a light-emitting module or another functional module provided in the power receiving device by light emitting color or other methods. For example, when the output voltage is compared with the set target voltage and it is determined that the power receiving device has reached the optimal charging state, the light-emitting module emits green light; when the output voltage is compared with the set target voltage and it is determined that the power receiving device has been charged but has not reached the optimal charging state, the light-emitting module emits yellow light to remind the user to adjust a position of the power receiving device; when the output voltage is compared with the set target voltage and it is determined that the power receiving device has not been charged, the light-emitting module emits red light to remind the user to confirm whether the power receiving device is out of a charging range or whether an assembly thereof is abnormal.

As shown in FIG. 2, the conductive coil 140 is located inside the cover body 110 and disposed beneath the circuit board 120. In some embodiments, an outer diameter of the conductive coil 140 is in a range of from 25 to 29 mm, but the invention is not limited thereto.

As shown in FIG. 2, the first magnetic shielding layer 150 is located inside the cover body 110 and disposed between the circuit board 120 and the conductive coil 140. The first magnetic shielding layer 150 has magnetic shielding and magnetic conduction functions to improve the wireless charging efficiency. In some embodiments, the first magnetic shielding layer 150 further has a heat dissipation function to help the circuit board 120 dissipate heat. In some embodiments, the first magnetic shielding layer 150 includes nickel zinc ferrite, manganese zinc ferrite, nano-gold or a combination thereof. In some embodiments, an initial permeability ($\mu i$) of the first magnetic shielding layer 150 at 25° C. is greater than or equal to 1,700. In some embodiments, referring to FIG. 2, the wireless charging receiver module further includes an adhesive layer (not shown) disposed between the first magnetic shielding layer 150 and the circuit board 120 to fix the first magnetic shielding layer 150 on a lower surface of the circuit board 120.

In some embodiments, a vertical projection of the conductive coil 140 is located within a vertical projection of the first magnetic shielding layer 150. In some embodiments, the first magnetic shielding layer 150 covers a hollow portion surrounded by the conductive coil 140 and a peripheral portion outside the conductive coil 140. In some embodiments, a diameter of the first magnetic shielding layer 150 is greater than the outer diameter of the conductive coil 140. In some embodiments, the diameter of the first magnetic shielding layer 150 is in a range of from 28 to 32 mm, but the present invention is not limited thereto.

Figure 3:
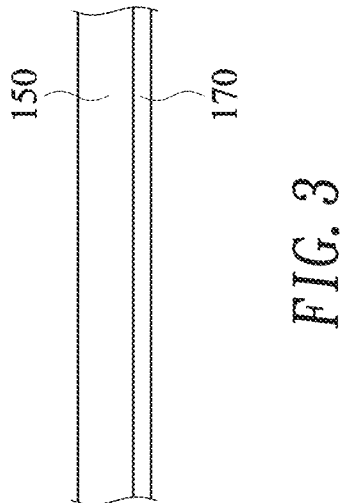
FIG. 3 is a cross-sectional view of a first magnetic shielding layer and a protective layer according to an embodiment of the present invention.

FIG. 3 is a cross-sectional view of a first magnetic shielding layer and a protective layer according to an embodiment of the present invention. In some embodiments, as shown in FIG. 3, the wireless charging receiver module further includes a protective layer (or may be referred to as a first protective layer) 170 disposed beneath the first magnetic shielding layer 150 to prevent the first magnetic shielding layer 150 from being damaged.

In some embodiments, as shown in FIGS. 1 and 2, the wireless charging receiver module further includes a set of second electrical connectors 160, which have a plurality of second conductive end portions 161, 162, 163, 164 exposed from the upper surface of the circuit board 120. The first conductive end portions 131, 132, 133, 134 and the second conductive end portions 161, 162, 163, 164 are respectively disposed on opposite sides of the upper surface of the circuit board 120, and the first conductive end portions 131, 132, 133, 134 and the second conductive end portions 161, 162, 163, 164 are respectively exposed from the first through holes 112a. As such, the user can blindly assemble the wireless charging receiver module without additional alignment components.

Figure 4:
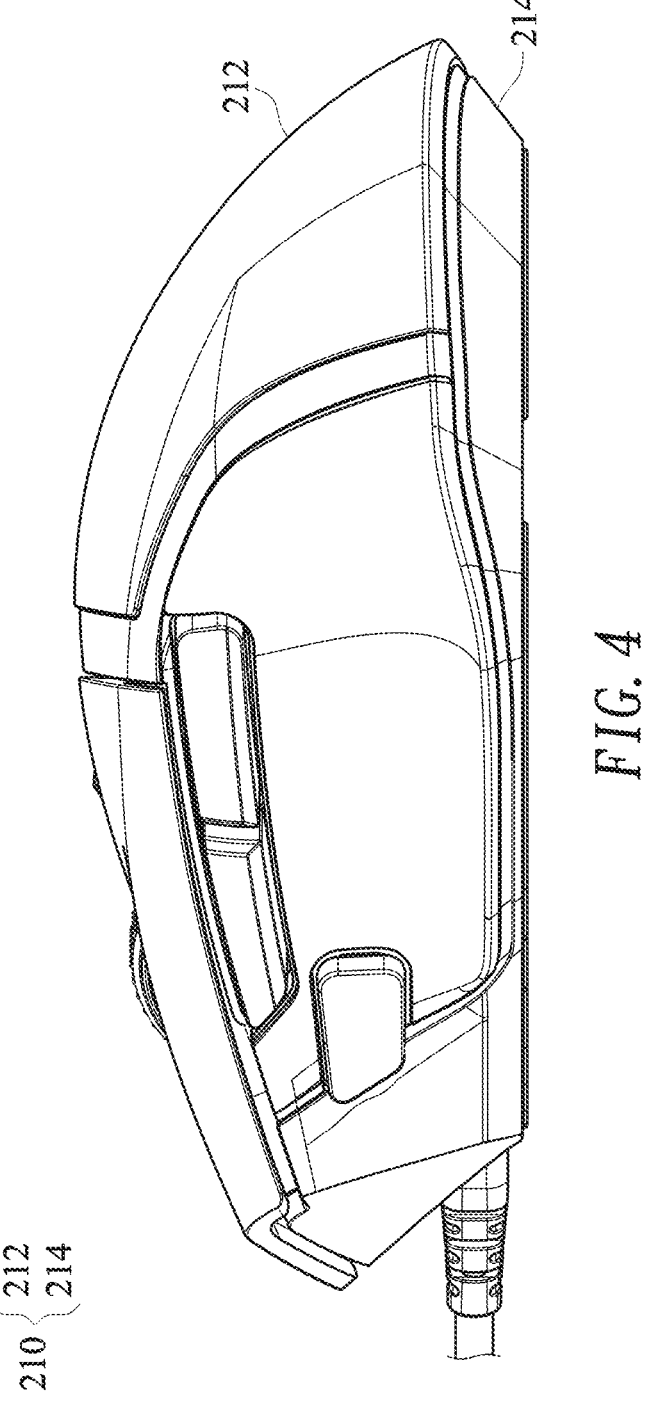
FIG. 4 is a three-dimensional schematic diagram of a wireless power receiving device according to an embodiment of the present invention.
Figure 6:
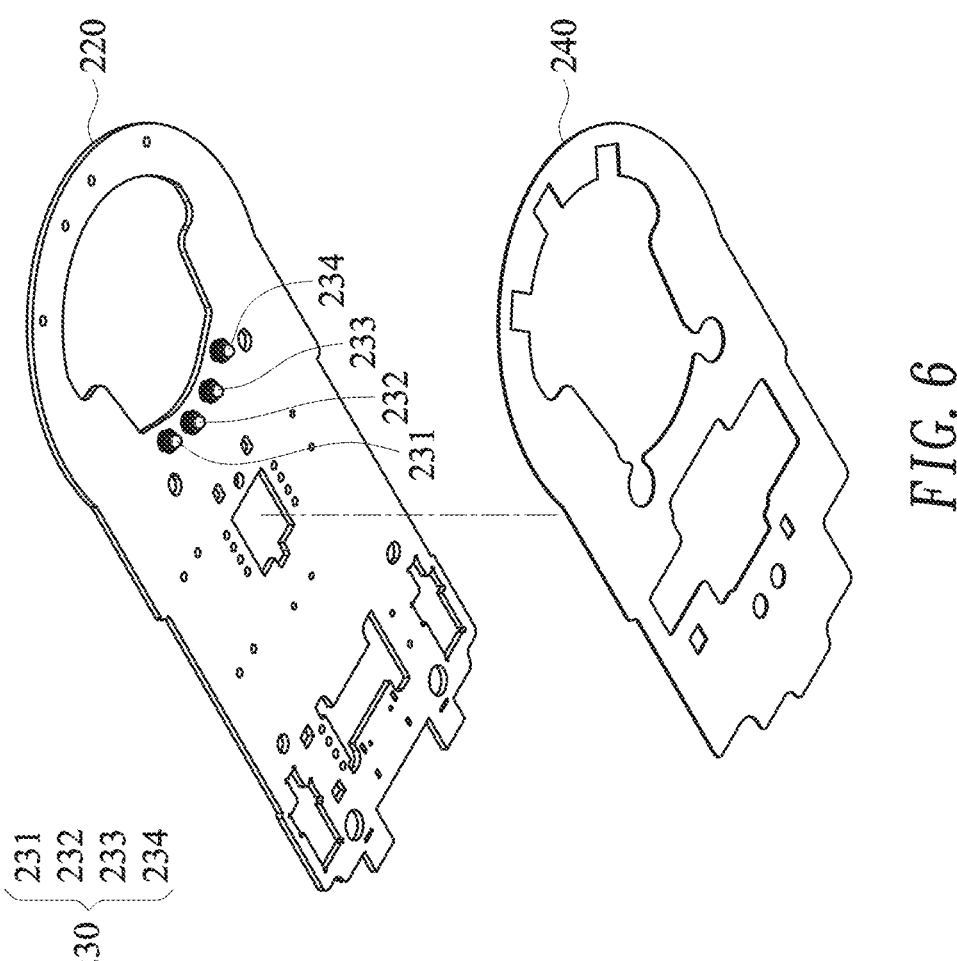
FIG. 6 is a three-dimensional exploded view of a mainboard and a second magnetic shielding layer according to an embodiment of the present invention.

The present invention also provides a wireless power receiving device, which includes a housing capable of accommodating the above-mentioned wireless charging receiver module, a mainboard, and a set of third electrical connecting components. FIG. 4 is a three-dimensional schematic diagram of a wireless power receiving device according to an embodiment of the present invention. FIG. 5 is a three-dimensional schematic diagram of the wireless power receiving device of FIG. 4 from another viewing angle. FIG. 6 is a three-dimensional exploded view of a mainboard and a second magnetic shielding layer according to an embodiment of the present invention. As shown in FIGS. 4 to 6, the wireless power receiving device includes a housing 210, a mainboard 220 and a set of third electrical connecting components 230. In some embodiments, the wireless power receiving device is a computer mouse (as shown in FIGS. 4 and 5), a keyboard, a tablet computer, a mobile phone, or other electronic devices.

In some embodiments, as shown in FIGS. 4 and 5, the housing 210 has an upper housing portion 212 and a lower housing portion 214. The lower housing portion 214 of the housing 210 has a recessed portion 214r, which is configured to accommodate the wireless charging receiver module (as shown in FIG. 1) and has a plurality of second through holes 214a. In some embodiments, two or more buckle structures (not marked) are disposed on sides of the housing 210, and the buckle structures correspond to the slots of the wireless charging receiver module, respectively.

The mainboard 220 is located inside the housing 210. The set of third electrical connectors 230 has a plurality of third conductive end portions 231, 232, 233, 234 exposed from a lower surface of the mainboard 220 and respectively exposed from the second through holes 214a of the recessed portion 214r. The third conductive end portions 231, 232, 233, 234 are configured to be electrically connected to the first conductive end portions 131, 132, 133, 134 of the set of first electrical connectors 130 of the wireless charging receiver module shown in FIG. 1, respectively, so as to charge the wireless power receiving device and perform data transmission. However, the present invention is not limited to the aforementioned embodiments, a number of the third conductive end portions 231, 232, 233, 234 may be less than four or greater than four according to actual needs. In some embodiments, the third conductive end portions 231, 232, 233, and 234 are POGO PINs. In some embodiments, the third conductive end portions 231, 232, 233, and 234 protrude from the second through holes 214a of the recess 214r, respectively.

In some embodiments, the recessed portion 214r further has a third through hole 214b disposed opposite to the second through holes 214a, and the wireless power receiving device further includes an elastic abutment member 250 exposed from the third through hole 214b of the recessed portion 214r. The set of third electrical connectors 230 and the elastic abutment member 250 are respectively disposed on two opposite sides of the recessed portion 214r. The elastic abutment member 250 is configured to push the wireless charging receiver module outward after the wireless charging receiver module as shown in FIG. 1 is embedded in the wireless power receiving device, so that the first conductive end portions 131, 132, 133, 134 are in closer contact with the third conductive end portions 231, 232, 233, 234, respectively, to avoid poor contact.

In some embodiments, as shown in FIGS. 4 and 6, the wireless power receiving device further includes a second magnetic shielding layer 240 located in the housing 210 and disposed on the lower surface of the mainboard 220. The second magnetic shielding layer 240 has a magnetic shielding function to prevent the mainboard 220 from generating eddy currents and abnormal heat, thereby reducing the wireless charging efficiency and the working stability of the wireless power receiving device. In some embodiments, the second magnetic shielding layer 240 further has a heat dissipation function to help the mainboard 220 dissipate heat. In some embodiments, the second magnetic shielding layer 240 includes nickel zinc ferrite, manganese zinc ferrite, nano-gold or a combination thereof. In some embodiments, an initial permeability (μi) of the second magnetic shielding layer 240 at 25° C. is greater than or equal to 1,700. In some embodiments, referring to FIG. 6, the wireless power receiving device further includes an adhesive layer (not shown) disposed between the second magnetic shielding layer 240 and the mainboard 220 to fix the second magnetic shielding layer 240 on the lower surface of the mainboard 220.

In some embodiments, referring to FIGS. 5 and 6, the second magnetic shielding layer 240 is adjacent to the set of third electrical connectors 230 and the recessed portion 214r. As such, the wireless charging receiver module of the present invention can be used with a Qi-certified wireless charging transmitter having a larger outer diameter of a conductive coil (i.e., the outer diameter of the conductive coil of the wireless charging transmitter is larger than the outer diameter of the conductive coil of the wireless charging receiver module of the present invention) to charge the wireless power receiving device and transmit data without causing metal parts (not shown, such as aluminum parts, counterweight metal blocks) near the recessed portion 214r to generate eddy currents and abnormally heat, thereby reducing the wireless charging efficiency and the working stability of the wireless power receiving device. In some embodiments, the second magnetic shielding layer 240 surrounds the recessed portion 214r. In some embodiments, a width of the second magnetic shielding layer 240 adjacent to or surrounding the recessed portion 214r is in a range of from 30 mm to 35 mm, but the present invention is not limited thereto. In some embodiments, an inner diameter of the second magnetic shielding layer 240 surrounding the recessed portion 214r is in a range of from 30 mm to 35 mm, and an outer diameter thereof is in a range of from 60 mm to 70 mm, but the present invention is not limited thereto.

In some embodiments, in order to prevent the wireless power receiving device from being disturbed by the wireless charging magnetic field, the second magnetic shielding layer 240 can be further disposed beneath other metal parts (not shown) that are farther away from the recessed portion 214r.

Figure 7:
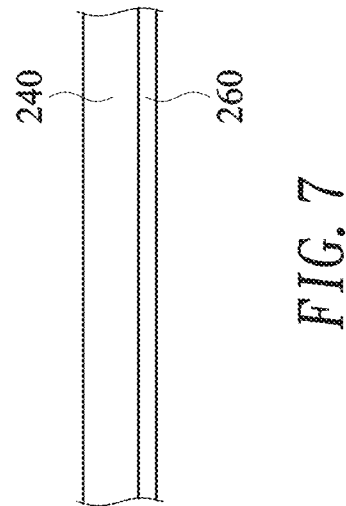
FIG. 7 is a cross-sectional view of a second magnetic shielding layer and a protective layer according to an embodiment of the present invention.

FIG. 7 is a cross-sectional view of a second magnetic shielding layer and a protective layer according to an embodiment of the present invention. In some embodiments, as shown in FIG. 7, the wireless power receiving device further includes a protective layer (or may be referred to as a second protective layer) 260 disposed on a lower surface of the second magnetic shielding layer 240. In some embodiments, the protective layer 260 is a light reflective layer having a high light reflectivity and a low light absorptivity. When the light-emitting module is provided in the wireless power receiving device, the light reflective layer can help a color of light beam to be brighter and fuller. In some embodiments, the light reflective layer is a white reflective layer.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not intended to limit the scope of claims of the present invention.

What is claimed is:

1. A wireless charging receiver module, comprising:
   a cover body, wherein an upper cover portion of the cover body has a plurality of first through holes;
   a circuit board, located in the cover body;
   a set of first electrical connectors, having a plurality of first conductive end portions exposed from an upper surface of the circuit board and respectively exposed from the first through holes;
   a set of second electrical connectors, having a plurality of second conductive end portions exposed from the upper surface of the circuit board, wherein the first conductive end portions and the second conductive end portions are respectively disposed on opposite sides of the upper surface of the circuit board, and the first conductive end portions and the second conductive end portions are respectively exposed from the first through holes;
   a conductive coil, located in the cover body and disposed beneath the circuit board; and
   a first magnetic shielding layer, located in the cover body and disposed between the circuit board and the conductive coil.

2. The wireless charging receiver module of claim 1, wherein the first magnetic shielding layer comprises nickel zinc ferrite, manganese zinc ferrite, nano gold or a combination thereof.

3. The wireless charging receiver module of claim 1, wherein a vertical projection of the conductive coil is located within a vertical projection of the first magnetic shielding layer.

4. The wireless charging receiver module of claim 1, wherein an upper surface of each of the first conductive end portions is substantially coplanar with an upper surface of the upper cover portion or lower than the upper surface of the upper cover portion.

5. The wireless charging receiver module of claim 1, wherein the first conductive end portions are respectively a voltage output line (Vout) contact, a ground line (GND) contact, a serial data line (SDA) contact and a serial clock line (SCL) contact.

6. A wireless power receiving device, comprising:
   a housing, wherein a lower housing portion of the housing has a recessed portion, and the recessed portion is configured to accommodate a wireless charging receiver module and has a plurality of second through holes, wherein the wireless charging receiver module comprises:
   a cover body, wherein an upper cover portion of the cover body has a plurality of first through holes;
   a circuit board, located in the cover body;
   a set of first electrical connectors, having a plurality of first conductive end portions exposed from an upper surface of the circuit board and respectively exposed from the first through holes;
   a conductive coil, located in the cover body and disposed beneath the circuit board; and
   a first magnetic shielding layer, located in the cover body and disposed between the circuit board and the conductive coil;
   a mainboard, located in the housing;
   a second magnetic shielding layer, located in the housing and disposed on the lower surface of the mainboard; and a set of third electrical connectors, having a plurality of third conductive end portions exposed from a lower surface of the mainboard and respectively exposed from the second through holes of the recessed portion, wherein the third conductive end portions are config- ured to be respectively electrically connected to the first conductive end portions of the set of first electrical connectors of the wireless charging receiver module.

7. The wireless power receiving device of claim 6, further comprising:

a protective layer, disposed on a lower surface of the second magnetic shielding layer.

8. The wireless power receiving device of claim 6, further comprising:

a second magnetic shielding layer, located in the housing and adjacent to the set of third electrical connectors and the recessed portion.

9. The wireless power receiving device of claim 6, wherein the recessed portion further has a third through hole disposed opposite to the second through holes, and the wireless power receiving device further comprises:

an elastic abutment member, exposed from the third through hole of the recessed portion.

10. The wireless power receiving device of claim 6, wherein the wireless power receiving device is a computer mouse.

\* \* \* \* \*